United States Patent

Surface

[11] Patent Number: 5,123,828
[45] Date of Patent: Jun. 23, 1992

[54] EXTRUDER VENT HAVING RECESSED VENT PASSAGEWAY OPENING

[75] Inventor: Christopher P. Surface, Cincinnati, Ohio

[73] Assignee: Cincinnati Milacron Inc., Cincinnati, Ohio

[21] Appl. No.: 690,276

[22] Filed: Apr. 24, 1991

[51] Int. Cl.5 .............................................. B29C 47/76
[52] U.S. Cl. ................................ 425/203; 366/75
[58] Field of Search ............... 425/200, 203, 202, 204, 425/208, 812, DIG. 60; 366/75, 69, 79; 264/101, 102

[56] References Cited

U.S. PATENT DOCUMENTS

| | | | |
|---|---|---|---|
| 3,192,564 | 7/1965 | Beck et al. | 425/203 |
| 3,376,603 | 4/1968 | Colombo | 425/203 |
| 3,535,737 | 10/1970 | Hendry | 425/203 |
| 3,599,292 | 8/1971 | Camerlata et al. | 425/203 |
| 3,712,594 | 1/1973 | Schippers et al. | 425/208 |
| 3,797,550 | 3/1974 | Latinen | 425/203 |
| 3,804,381 | 4/1974 | Bielfeldt et al. | 425/203 |
| 4,060,226 | 11/1977 | Schweller | 425/203 |
| 4,094,942 | 6/1978 | Nakai et al. | 425/203 |
| 4,185,060 | 1/1980 | Ladney | 425/203 |
| 4,298,322 | 11/1981 | Anders et al. | 425/203 |
| 4,314,765 | 2/1982 | Hotz | 425/203 |
| 4,578,455 | 3/1986 | Pipper et al. | 425/203 |
| 4,776,784 | 10/1988 | Batiuk | 425/203 |
| 4,824,448 | 4/1989 | Moriyama | 425/203 |
| 4,929,407 | 5/1990 | Giza | 425/203 |

*Primary Examiner*—Jay H. Woo
*Assistant Examiner*—W. J. Matney
*Attorney, Agent, or Firm*—Nies, Kurz, Bergert & Tamburro

[57] ABSTRACT

A vent housing for use with an extruder having a rotatable screw positioned within a tubular barrel. The vent housing includes a vent passageway that provides communication between the interior surface of the extruder barrel and a source of reduced pressure in order to draw from within the barrel any gasses and vapors that might be generated or liberated during plastication. The inlet portion of the vent housing is spherically recessed to provide a gap or recess between the barrel inner surface and the vent passageway inlet. The longitudinal axis of the vent passageway is offset from the longitudinal axis of the vent housing axis, and the vent passageway inlet is positioned on the upstream side of the vent housing, relative to the direction of flow of plasticated material. The provision of a spherical recess at the vent housing inlet permits the plasticated material to continue its rolling movement without entering or obstructing the vent passageway, and it avoids the need for mechanical pushing devices to prevent entry of plasticated material into the vent passageway.

22 Claims, 5 Drawing Sheets

EXTRUDER VENT HAVING RECESSED VENT PASSAGEWAY OPENING

BACKGROUND OF THE INVENTION

1. Field of the Invention

The present invention relates to a vent structure for venting the interior of an extruder barrel to permit the escape of gasses from within the barrel. More particularly, the present invention relates to an extruder vent stack that is so configured as to minimize the passage of plasticated material into the vent passageway, and thereby avoid blockage of the vent.

2. Description of the Related Art

The notion of providing a vent opening in an extruder barrel to permit the escape of gasses generated or liberated during plastication of polymeric materials is broadly known. For example, in U.S. Pat. No. 4,185,060, which issued on Jan. 22, 1980, to Michael Ladney, Jr., a vent arrangement is disclosed in the form of a radially extending vent passageway that provides communication between the interior of an extruder barrel and a vacuum system. However, with vent systems of that type it is possible for the plasticated material to enter the vent passageway, and either to block the passageway, or, alternatively, to be drawn into the vacuum system.

One structural arrangement intended to avoid the problem of plasticated material entering and blocking a vent passageway is shown in U.S. Pat. No. 4,824,448, which issued on Apr. 25, 1989, to Masao Moriyama. The device disclosed in that patent is a generally conical rotor that includes volute-shaped protrusions, and which is rotated in order to mechanically push the plasticated material back toward the screw and thereby prevent it from passing into the vent passageway. That patent also discloses the prior use of a pair of interengaged screws that are carried in a barrel that extends upwardly from the extruder barrel, and that is operated so that the rotation of the screws pushes back the plasticated material to prevent its entry into the gas exhaust pipe.

It is an object of the present invention to provide a vent opening structure which simultaneously permits the passage therethrough of gasses and other volatiles, but that also is so configured that plasticated material is not drawn into the vent passageway.

It is another object of the present invention to provide an extruder vent arrangement in which mechanical pushing or pressing elements are not necessary.

SUMMARY OF THE INVENTION

Briefly stated, in accordance with one aspect of the present invention, a vent structure is provided for a plastics extruder that includes an extrusion screw rotatably carried within a tubular barrel. The vent arrangement includes a vent housing having a vent passageway to provide communication between a vent opening in the barrel and a source of vacuum. The vent housing extends through the extruder barrel and at its innermost end it includes a recessed surface that is spaced from the flight lands of the extruder screw. The vent passageway terminates at the recessed surface.

DESCRIPTION OF THE PREFERRED EMBODIMENTS

Figure 1:
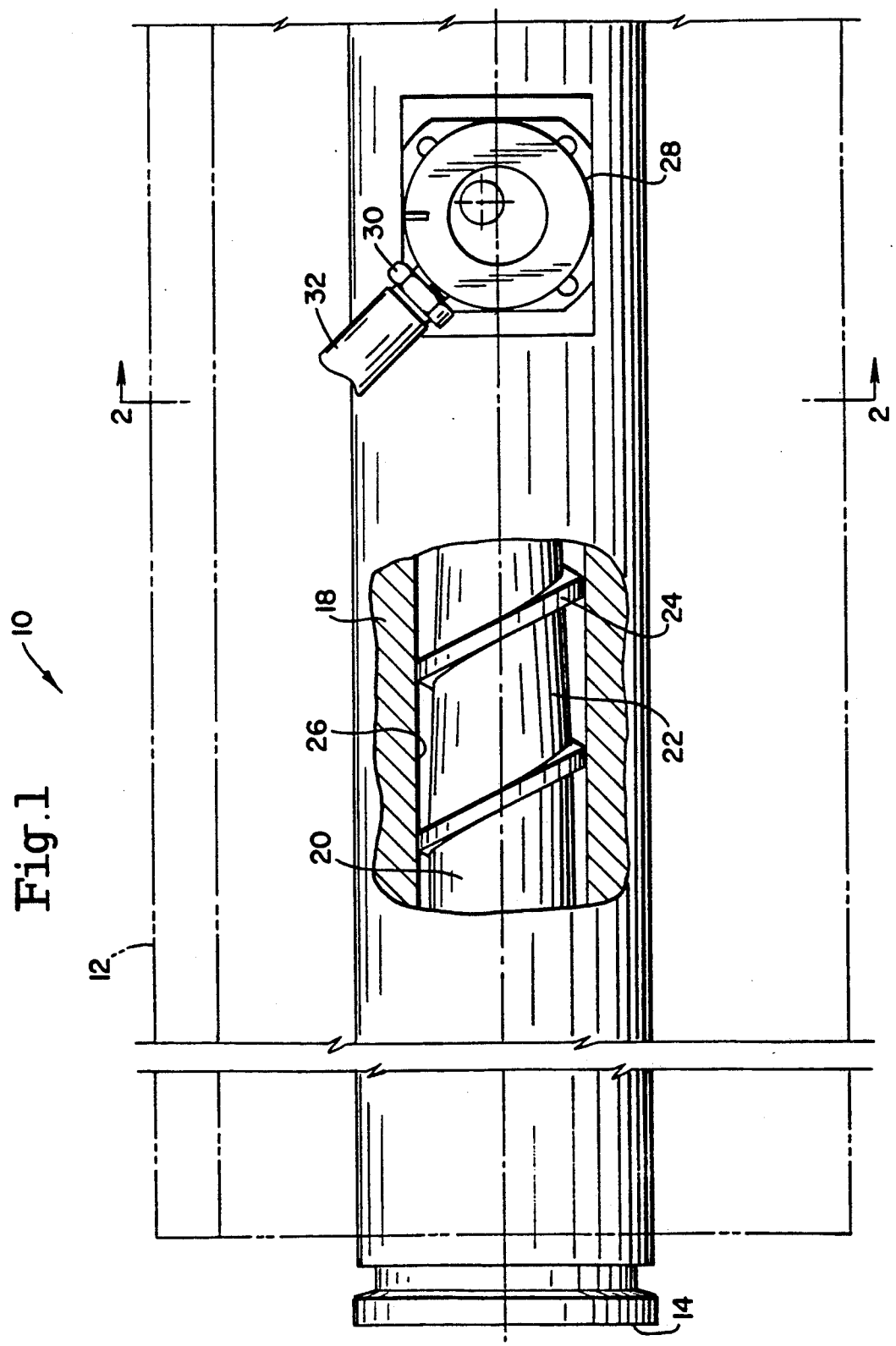
FIG. 1 is a fragmentary side view of an extruder, partially broken away to show the extruder barrel and screw, and also showing the position and orientation of vent apparatus in accordance with the present invention.
Figure 2:
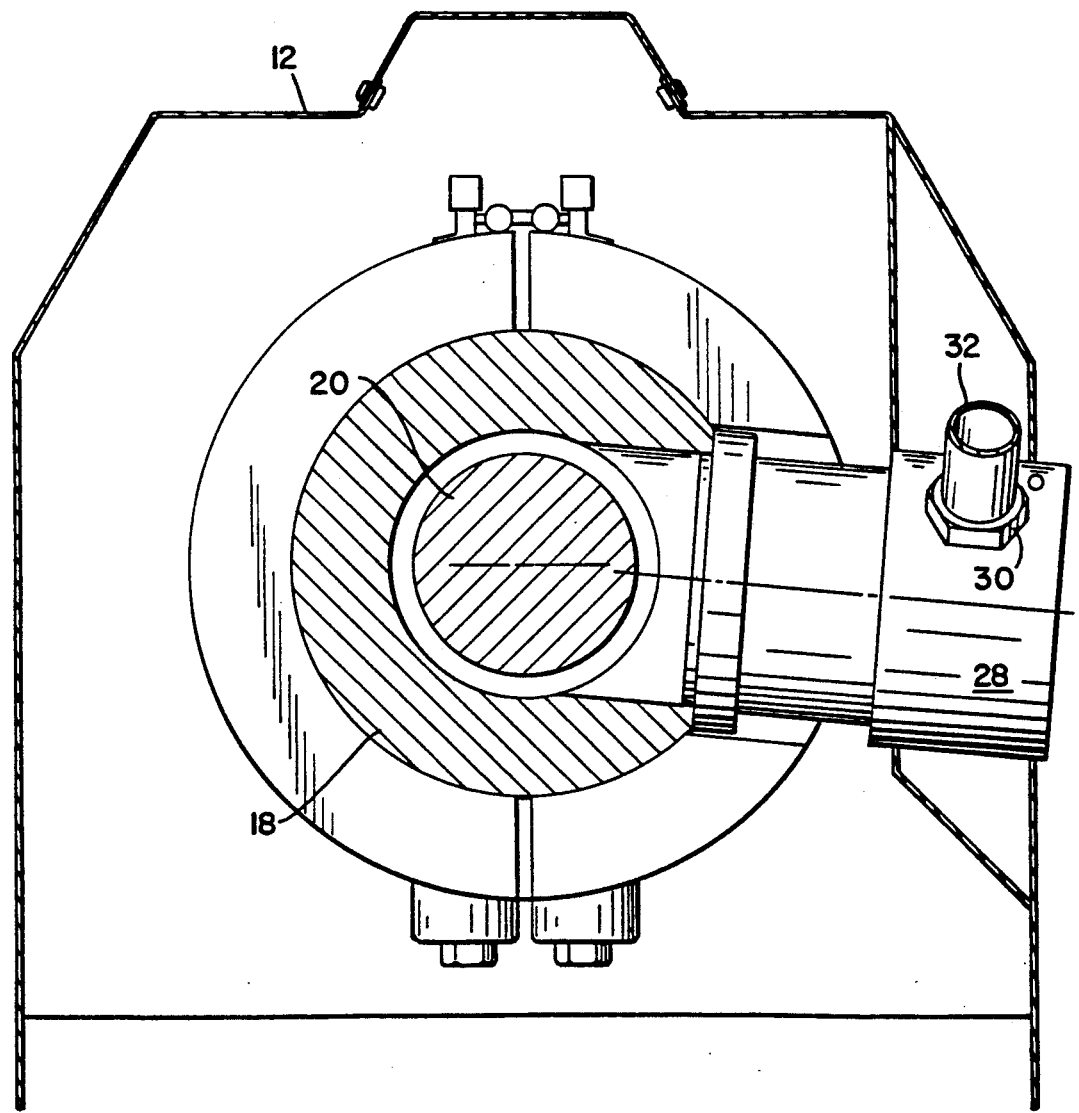
FIG. 2 is a cross-sectional view taken along the line 2—2 of FIG. 1.

Referring now to the drawings, and particularly to FIGS. 1 and 2 thereof, there is shown an extruder 10 that includes an elongated, sheet metal outer cover 12 that has a rectangular cross section, and a material outlet 14 to which a suitable extrusion die head (not shown) can be connected to provide an extruded article of desired cross section. Outer cover 12 encloses a tubular barrel 18 that can have externally positioned heating or cooling devices (not shown), such as electrical resistance band heaters, coils for circulating heated or cooled fluid, or the like, in order to permit the temperature of the barrel to be controlled so that the temperature of the material within the barrel can be regulated.

Rotatably carried within barrel 18 is an extruder screw 20 in the form of a continuous central shaft 22 of cylindrical or conical shape, that includes one or more external helical flights 24 that extend radially outwardly around screw 20 between central shaft 22 and the inner surface 26 of barrel 18. When rotated within barrel 18, screw 20 mechanically works and axially and circumferentially advances the material being processed to move the material along the length of barrel 18 in a direction toward extruder outlet 14.

As will be appreciated by those skilled in the art, extruder screws typically include at least three operating zones positioned axially along the screw. The first zone, adjacent the material inlet, is the so-called feed zone, within which the material is heated and then conveyed downstream. Next is the so-called compression zone in which the material flow area gradually diminishes to effectively increase the pressure acting on the material as the material continues to be heated. Finally, adjacent the material outlet is the so-called metering zone, in which homogenization of the material takes place so that the material that enters the extrusion die is of uniform temperature and pressure. Additionally, screws having multiple compression and metering zones, and also screws having mixing zones, are also known.

Where the material being plasticated is hygroscopic, or where the material has a tendency to liberate gases when it is heated, the plastication screws for such materials include a so-called decompression zone, within which the pressure on the material is relieved somewhat so that the water vapor and gases, but not the plasticated material, can escape through a vent in the barrel. Of course, to be effective, the vent must be positioned so that it opens into the area of the decompression zone of the screw.

In the embodiment of the present invention as illustrated in the drawings, a vent housing 28 is carried by extruder 10 and extends through barrel 18 outwardly from barrel inner surface 26 in a substantially radial direction and laterally through outer cover 12. Vent housing 28 includes a fitting 30 to permit the connection to the housing of a vacuum conduit 32, which is in communication with a vacuum pump (not shown) or another source of sub-atmospheric pressure. Along with vacuum conduit 32, vent housing 28 provides a communication path between barrel inner surface 26 and the vacuum pump to permit the withdrawal from within the barrel of steam, gasses, and other volatiles that might be generated or liberated during the extrusion process as the material being processed is heated and subjected to pressure as it travels along the extruder axis toward extruder outlet 14. Preferably, vent housing 28 is positioned on barrel 18 so that the longitudinal axis of housing 28 is inclined at an angle of about 5° below the horizontal.

Figure 3:
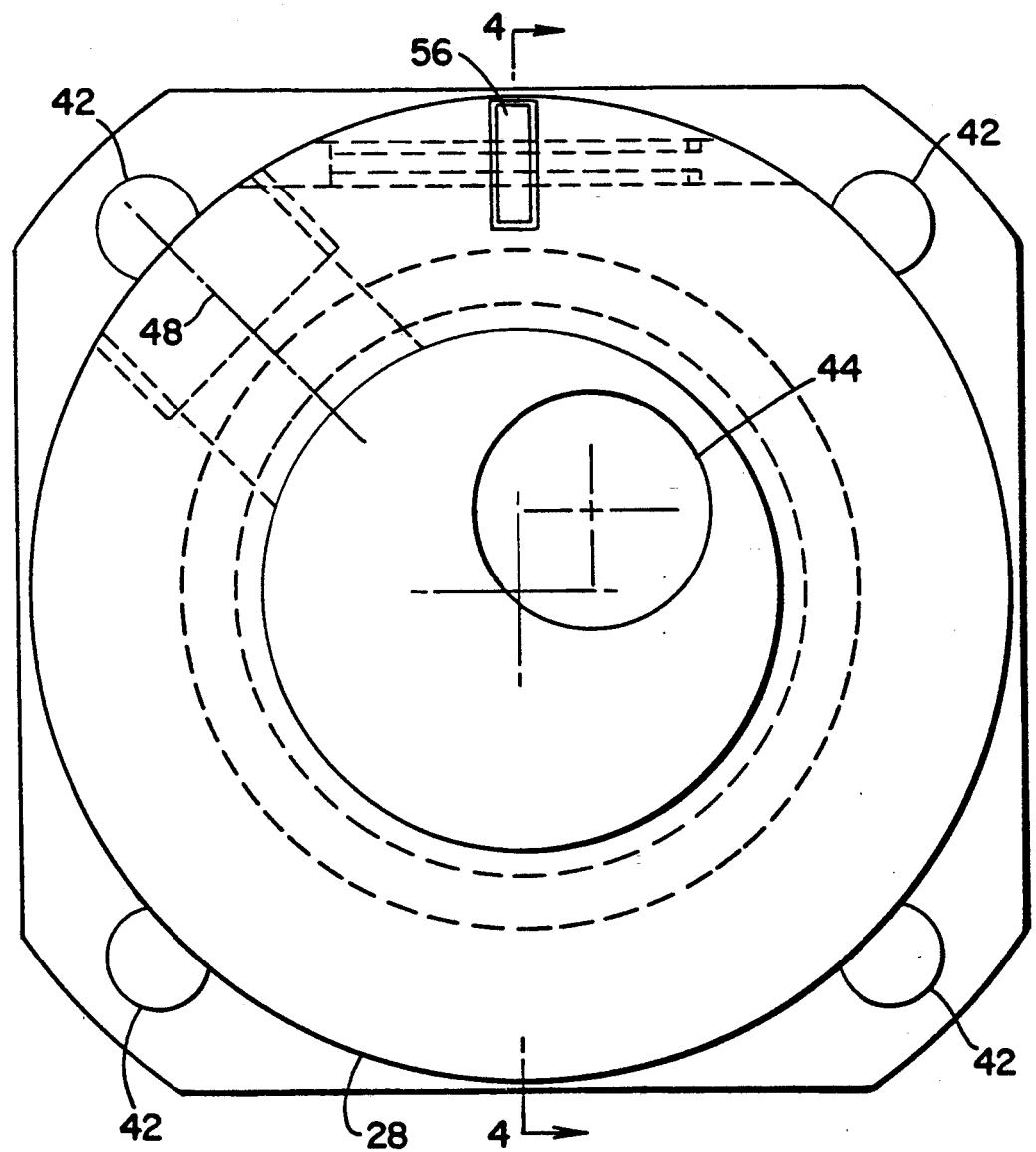
FIG. 3 is an enlarged end view of a vent housing forming part of the vent apparatus shown in FIG. 1.
Figure 4:
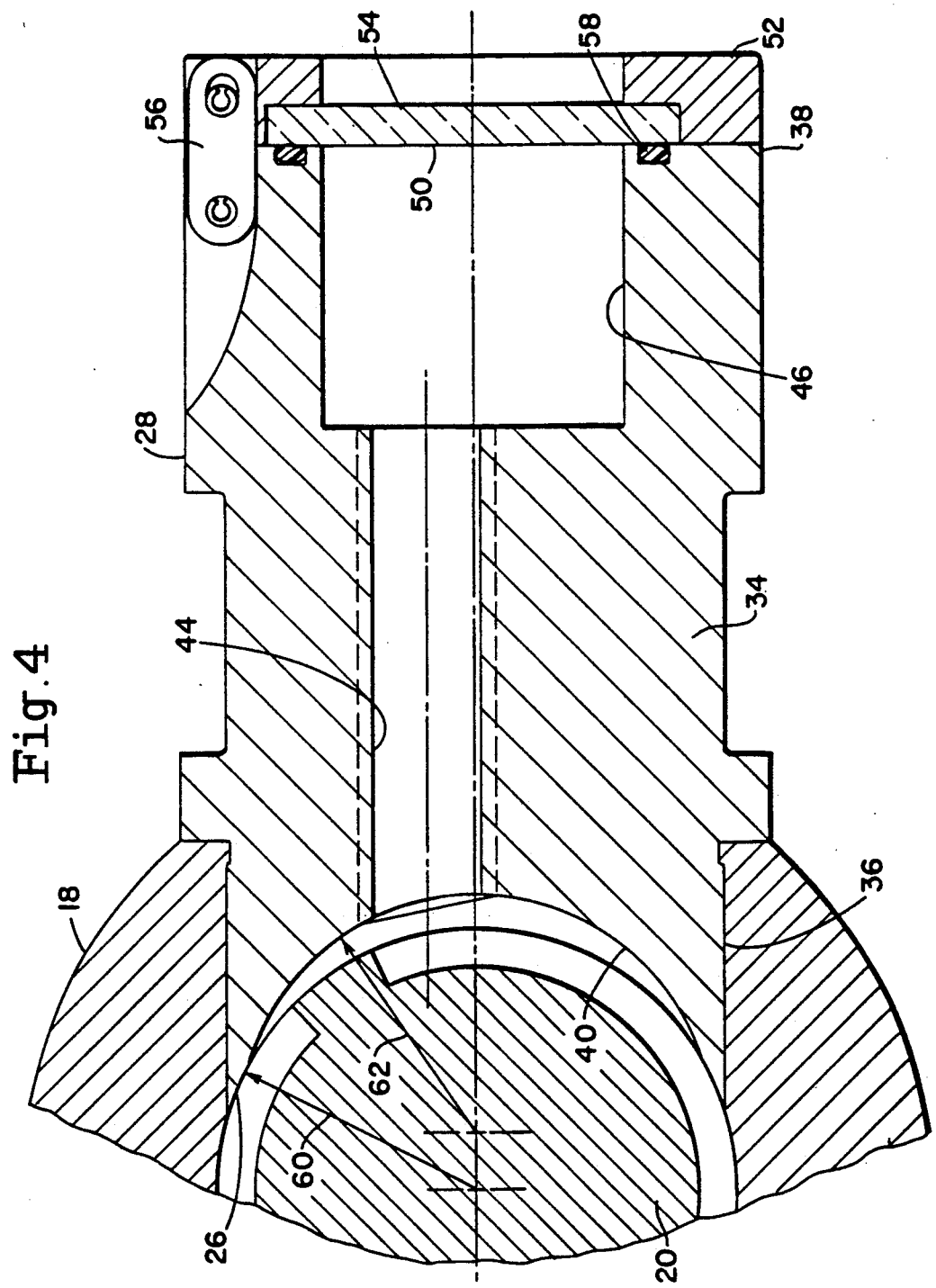
FIG. 4 is a cross-sectional view of the vent housing of FIG. 3, taken along the line 4—4 thereof.

The structure of vent housing 28 is shown in greater detail in FIGS. 3 and 4. As there shown, housing 28 is in the form of a tubular body 34 that includes a inlet end 36 and an outlet end 38. Inlet end 36 is received in a correspondingly-shaped opening in the wall of barrel 18 so that the inner end surface 40 of vent housing 28 faces extruder screw 20. Housing 28 can be bolted to the barrel by bolts adapted to be received in bolt holes 42.

Vent housing 28 includes an inner passageway 44 that extends from inlet end 36 through the body of housing 28 to a plenum chamber 46 adjacent housing outlet end 38. Plenum chamber 46 includes an outlet passageway 48 to which fitting 30 and vent conduit 32 are connected (see FIGS. 1 and 2) to provide communication between inner surface 26 of barrel 18 and the source of vacuum (not shown) through vent housing 28. Plenum chamber 46 is in the form of a cylindrical chamber, the outermost axial end 50 of which is closed by a cover cap 52 that carries a sight glass 54. Cover cap 52 is held in position against outer end 38 of vent housing 28 by means of a hinge 56. An O-ring 58 can be provided between the innermost surface of sight glass 54 and the end wall of housing 28 to provide a seal.

As best seen in FIG. 4, vent housing inlet 36 is inwardly recessed, the recess defined by a pair of circular arcs 60 and 62. First circular arc 60 is substantially equal to the radius of barrel inner surface 26. Second circular arc 62 has a smaller radius than that of arc 60 and has its center positioned at a point spaced radially outwardly from the axis of the barrel, to define with arc 60 in the cross-sectional view of FIG. 4 a crescent-shaped space or gap between barrel inner surface 26 and vent housing inner surface 40. The surface defined by second circular arc 62 is a spherical surface, to define a spherical depression at inner surface 40. As will be appreciated by those skilled in the art, the specific radii will be dependent upon the size of the extruder barrel, which influences the output capacity of the machine. However, it has been found that the linear offset between the center of arc 60 and the center of arc 62 can advantageously be about 12 to 13 mm., and the range of values for the ratio of the radius of arc 60 to the radius of arc 62 can be from about 1.0 to about 1.13. Those numerical values correspond with a ratio of barrel inner radius (arc 60) to the linear offset ranging from about 3.75 to about 4.6, with the smaller value corresponding with a smaller capacity machine.

Vent passageway 44 is linear and has its longitudinal axis oriented substantially parallel with the longitudinal axis of vent housing 28, as shown in FIG. 4. Additionally, and as more clearly seen in FIGS. 3 and 5, vent passageway 44 has its longitudinal axis offset from the longitudinal axis of vent housing 28.

Figure 5:
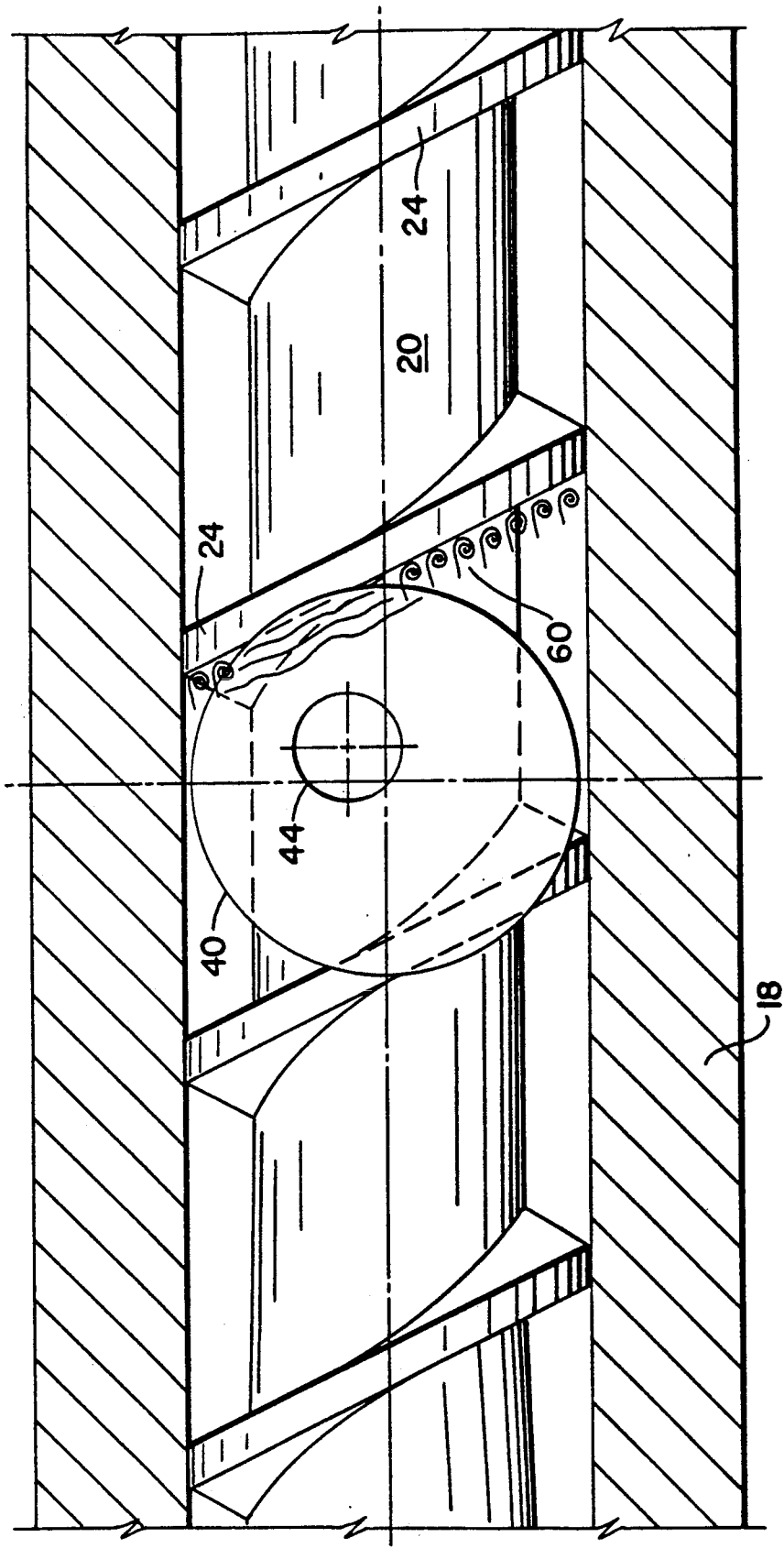
FIG. 5 is an enlarged, fragmentary view showing the position of the vent housing inlet and vent passageway inlet relative to the flights of a screw positioned within an extruder barrel.

Preferably, vent passageway 44 is positioned so that its longitudinal axis lies in the upper right-hand quadrant of vent housing 28, as viewed in FIGS. 3 and 5, so that when vent housing 28 is in position on extruder barrel 18 vent passageway 44 is on the upstream side of the longitudinal axis of vent housing 28, relative to the direction of flow of plasticated material within barrel 18. The position of vent passageway 44 is such that as the plasticated material moves along the barrel toward barrel outlet 14 it is exposed to subatmospheric pressure upon its travel past the recessed volume defined by the surfaces described by circular arcs 60 and 62 at vent housing inlet 36.

FIG. 5 shows the positions of screw flights 24 and the direction of rotation of screw 20 relative to the position of vent passageway 44. As the material is scraped from inner surface 26 of barrel 18 by screw flights 24, it undergoes a rolling motion represented by curled arrows 60, and the positioning of vent passageway on the upstream side of vent housing 28 prevents the rolling material from entering and clogging vent passageway 44.

In operation, polymeric material in pelletized or powdered form is provided at a material inlet (not shown), which can include a hopper positioned above extruder screw 20 at a point spaced upstream from extruder outlet 14. The rotation of screw 20 carries the material in a forward direction, toward extruder outlet 14, and heats the material by virtue of mechanical working, as well as a result of any heat applied externally to barrel 18, whereupon the material softens and ultimately melts as it is carried along barrel 18 by screw 20. As the material is heated, any moisture that might have been present on or in the material initially, and also any volatile constituents that are part of the starting material, could be liberated as a result of the increased temperature to which the material is raised as it is carried along barrel 18. The presence of gasses or vapors within the softened, plasticated material could cause voids or other discontinuities in the extruded shape unless the gasses and vapors are removed. Consequently, vent housing 28 of the present invention permits extraction of such gasses and other volatiles through vent housing 28 by the connection thereto of a suitable source of sub-atmospheric pressure.

Because the plasticated material could possibly be drawn into vent passageway 44, which could obstruct passageway 44 and disable the venting function, some prior art extruders included mechanical devices at the barrel vent outlet to physically push the plasticated material back into the barrel. The present invention, on the other hand, avoids the need for such mechanical devices, as well as their additional cost and complexity, because the configuration of vent housing inlet 36, together with the positioning of the inner opening of vent passageway 44, take into account the type of motion that the plasticated material undergoes, in order to prevent movement of the plasticated material into vent passageway 44. In that regard, it has been found that with the present invention, the rolling motion of the plasticated material as screw flight 14 scrapes it from barrel inner surface 26 carries the material in a substantially circular path within the flow channel between adjacent flights, and the recessed position of the inlet to vent passageway 44, relative to the outer surface of the screw lands, permits the material to complete its rolling motion without entering the inlet to vent passageway 44. Consequently, mechanical pushing devices are not needed to push the material from the vent passageway back into the barrel and prevent its passage into the vent passageway. The present invention therefore provides a simpler and less expensive venting arrangement that functions effectively to vent the interior of an extruder barrel.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. Vent apparatus for providing communication between a vent opening in the cylindrical inner surface of a tubular extruder barrel having a longitudinal axis and that includes a rotatable plastication screw, said vent apparatus comprising:
   a. a vent housing of substantially tubular form, the vent housing including a longitudinal axis and having a vent housing outlet for communication with a source of reduced pressure and having a vent housing inlet adapted to communicate with the vent opening in the extruder barrel;
   b. a vent passageway having a vent passageway longitudinal axis and extending through the vent housing from the vent housing inlet to the vent housing outlet;
   c. the vent housing inlet including a recess and the vent passageway having a vent passagway inlet that is positioned at the recess, the recess defining a crescent-shaped space in planes parallel to and perpendicular to the extruder barrel axis so that the vent passageway inlet is spaced from the inner surface of the barrel to prevent the entry into the vent passageway of plasticated material transported along the extruder barrel by the extruder screw.

2. Vent apparatus in accordance with claim 1 wherein the recess in the vent housing inlet defines a spherical surface.

3. Vent apparatus in accordance with claim 2 wherein the spherical surface has a radius of curvature that is smaller than the radius of curvature of the inner surface of the extruder barrel.

4. Vent apparatus in accordance with claim 1 wherein the vent passageway extends laterally outwardly relative to the extruder barrel.

5. Vent apparatus in accordance with claim 4 wherein the vent passageway has a longitudinal axis that is inclined relative to a horizontal plane passing through the extruder barrel longitudinal axis.

6. Vent apparatus in accordance with claim 5 wherein the vent passageway longitudinal axis is inclined at an angle about 5° below a horizontal plane passing through the extruder barrel longitudinal axis.

7. Vent apparatus in accordance with claim 1 wherein the vent passageway has a longitudinal axis that is offset from the longitudinal axis of the vent housing.

8. Vent apparatus in accordance with claim 7 wherein the vent passageway axis lies in a horizontal plane that is above a horizontal plane that passes through the vent housing axis.

9. Apparatus in accordance with claim 7 wherein the vent passageway axis is offset from and on the upstream side of the vent housing axis, relative to an axial direction of flow of plasticized material within the extruder barrel.

10. Vent apparatus in accordance with claim 9 wherein the vent passageway is positioned above a horizontal plane passing through the vent housing axis.

11. Vent apparatus in accordance with claim 1 wherein the recess is symmetrical about a recess longitudinal axis, and the recess longitudinal axis is offset from and substantially parallel with the vent passageway longitudinal axis.

12. An extruder for plasticizing and extruding polymeric materials, said extruder comprising:
   a. a tubular barrel containing a rotatable plasticating screw, the barrel having a longitudinal axis and including an inner cylindrical surface against which at least one flight carried by the screw is adapted to pass, and a vent opening extending through the barrel from the inner cylindrical surface; and
   b. a vent housing of substantially tubular form, the vent housing including a longitudinal axis and having a vent housing outlet for communication with a source of reduced pressure and having a vent housing inlet adapted to communicate with the vent opening in the barrel; and
   c. a vent passageway having a vent passageway longitudinal axis and extending through the vent housing from the vent housing inlet to the vent housing outlet, the vent housing inlet including a recess and the vent passageway having a vent passageway inlet that is positioned at the recess, the recess defining a crescent-shaped space in planes parallel to and perpendicular to the extruder barrel axis so that the vent passageway inlet is spaced from the inner surface of the barrel to prevent the entry into the vent passageway of plasticated material transported along the extruder barrel by the extruder screw.

13. Vent apparatus in accordance with claim 12 wherein the recess in the vent housing inlet defines a spherical surface.

14. Vent apparatus in accordance with claim 13 wherein the spherical surface has a radius of curvature that is smaller than the radius of curvature of the inner surface of the extruder barrel.

15. Vent apparatus in accordance with claim 12 wherein the vent passageway extends laterally outwardly relative to the extruder barrel.

16. Vent apparatus in accordance with claim 15 wherein the vent passageway has a longitudinal axis that is inclined relative to a horizontal plane passing through the extruder barrel longitudinal axis.

17. Vent apparatus in accordance with claim 16 wherein the vent passageway longitudinal axis is inclined at an angle of about 5° below a horizontal plane passing through the extruder barrel longitudinal axis.

18. Vent apparatus in accordance with claim 12 wherein the vent passageway has a longitudinal axis that is offset from the longitudinal axis of the vent housing.

19. Vent apparatus in accordance with claim 18 wherein the vent passageway axis lies in a horizontal plane that is above a horizontal plane that passes through the vent housing axis.

20. Apparatus in accordance with claim 18 wherein the vent passageway axis is offset from and on the upstream side of the vent housing axis, relative to an axial direction of flow of plasticated material within the extruder barrel.

21. Vent apparatus in accordance with claim 20 wherein the vent passageway is positioned above a horizontal plane passing through the vent housing axis.

22. Vent apparatus in accordance with claim 12 wherein the recess is symmetrical about a recess longitudinal axis, and the recess longitudinal axis is offset from and substantially parallel with the vent passageway longitudinal axis.

* * * * *